United States Patent
Funahashi

[19]

[11] Patent Number: 5,986,241
[45] Date of Patent: Nov. 16, 1999

[54] HEATING CONTROL SYSTEM FOR HEATER PROVIDED IN LASER PRINTER

[75] Inventor: Norimichi Funahashi, Nisshin, Japan

[73] Assignee: Brother Kogyo Kabushiki Kaisha, Nagoya, Japan

[21] Appl. No.: 08/979,830

[22] Filed: Nov. 24, 1997

[30] Foreign Application Priority Data

Nov. 26, 1996 [JP] Japan .................................. 8-314764

[51] Int. Cl.$^6$ .................................................. H05B 4/02
[52] U.S. Cl. .......................... 219/497; 219/216; 219/501; 219/505; 323/364
[58] Field of Search .................................. 219/497, 501, 219/506, 505, 494, 216, 646; 323/235, 236, 319, 364; 307/117; 332/109

[56] References Cited

U.S. PATENT DOCUMENTS

| | | | |
|---|---|---|---|
| 5,124,518 | 6/1992 | Lee | 219/10.55 B |
| 5,412,453 | 5/1995 | Matsuo . | |
| 5,444,521 | 8/1995 | Tomoyuki et al. . | |
| 5,543,604 | 8/1996 | Taylor | 219/643 |
| 5,630,198 | 5/1997 | Makino . | |

FOREIGN PATENT DOCUMENTS

| | | |
|---|---|---|
| 2-018589 | 1/1990 | Japan . |
| 2-043587 | 2/1990 | Japan . |
| 3-034284 | 2/1991 | Japan . |

*Primary Examiner*—Mark Paschall
*Attorney, Agent, or Firm*—Oliff & Berridge, PLC

[57] ABSTRACT

A heater temperature control circuit for controlling a temperature of, for example, a heater incorporated in a laser printer for fixing a toner image on a recording material includes a voltage divider circuit delivering an output voltage divided by a thermistor changing a resistance value thereof in response to temperature changes with generation of heat by a heater and a resistance having a predetermined resistance value, and a heater control circuit comparing the output voltage of the voltage divider circuit with a reference voltage, thereby delivering a control signal for controlling an amount of heat generated by the heater on the basis of results of comparison. The heater temperature control circuit further includes a pulse width modulation circuit capable of changing a duty of an output signal thereof in response to an external instruction signal, and an integrating circuit integrating the output signal delivered from the pulse width modulation circuit, thereby delivering an integrated signal serving as the reference voltage.

16 Claims, 5 Drawing Sheets

HEATING CONTROL SYSTEM FOR HEATER PROVIDED IN LASER PRINTER

BACKGROUND OF THE INVENTION

1. Field of the Invention

This invention relates to a heater temperature control circuit suitable, for example, for carrying out temperature control of a heater for fixing a toner image on a recording material in laser printers.

2. Description of the Related Art

Figure 5:
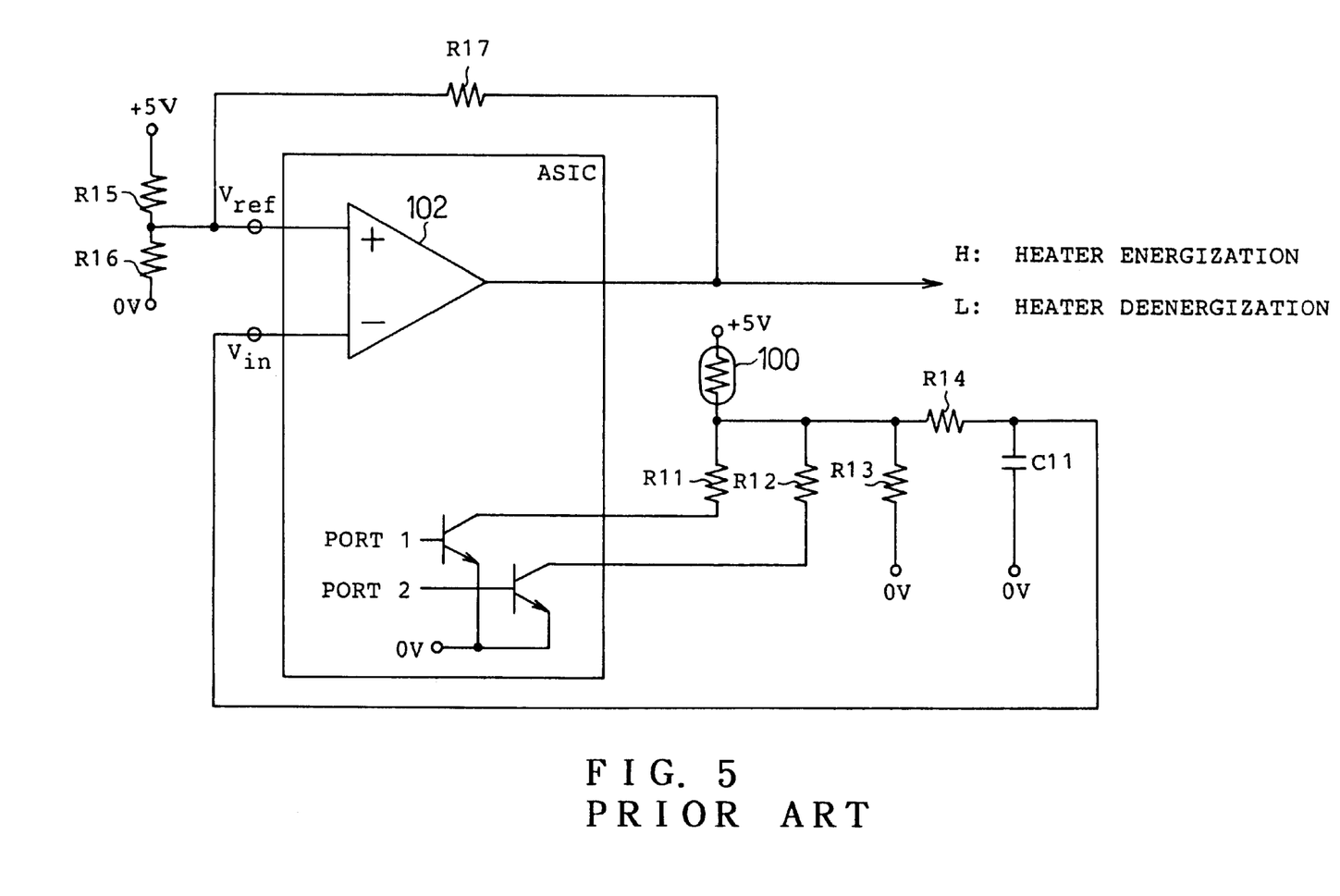
FIG. 5 is an electric circuit diagram of a conventional heater temperature control circuit.

In laser printers, temperature control of a heater for fixing a toner image on a recording material is conventionally carried out by a heater temperature control circuit as shown in FIG. 5. The shown heater temperature control circuit comprises a comparator 102 for comparing, with a fixed reference voltage $V_{ref}$, a divided voltage $V_{in}$ divided by a thermistor 100 mounted on a heater and a resistance R13. The heater is turned on and off on the basis of the results of comparison. In the above-described arrangement, however, a set value (divided voltage $V_{in}$) of a control temperature (a target temperature) for the heater is determined by a resistance value of the resistance R13 used. The resistance R13 needs to be replaced by another having a different resistance value when the set value is changed after the assembling of the resistance. The replacement of resistances takes a great deal of trouble. Furthermore, a plurality of resistances R11, R12 and R13 are required in order that the heater temperature control circuit may have a plurality of set values of the control temperature, as shown in FIG. 5. In the arrangement of FIG. 5, the resistance R11 is used for the control temperature of 160° C., for example. The resistance R12 is used for the control temperature of 180° C. The resistance R13 is provided for detecting an abnormal condition of the heater. An increase in the number of resistances increases a manufacturing cost of the heater temperature control circuit. Additionally, a complicated control manner is required when the set value of control temperature is changed minutely. In this case, a large number of resistances having different resistance values need to be provided. This would be substantially impossible. A resistance R17 in FIG. 5 is provided for giving a function of hysteresis to the circuit.

To solve the above-described problems, the prior art has provided an arrangement that a divided output divided by the thermistor 100 and the resistance R13 is converted to a digital value (digital signal) by an A/D converter, which digital value is read by means of software in a microcomputer. Based on the digital value read (detected temperature), the microcomputer on/off-controls the heater by means of software. In this case, since a determination or reference value for the divided voltage $V_{in}$ is changed in a software manner, a complicated temperature control manner can be accomplished without use of a large number of resistances. However, an A/D converter is an expensive device and accordingly, the manufacturing cost of the heater temperature control circuit is largely increased.

SUMMARY OF THE INVENTION

Therefore, an object of the present invention is to provide a heater temperature control circuit which is inexpensive in cost and in which the set value of control temperature can minutely be changed by means of software.

The present invention provides a heater temperature control circuit comprising a voltage divider circuit delivering an output voltage divided by a thermistor changing having a resistance value changing with temperature changes due to generation of heat by a heater and a resistance having a predetermined resistance value, a heater control circuit comparing the output voltage of the voltage divider circuit with a reference voltage, thereby delivering a control signal for controlling an amount of heat generated by the heater on the basis of results of comparison, a pulse width modulation circuit changing a duty of an output signal thereof in response to an external instruction signal, and an integrating circuit integrating the output signal delivered from the pulse width modulation circuit, thereby delivering an integrated signal serving as the reference voltage.

According to the above-described arrangement, the reference voltage can readily be changed by the combined pulse width modulation circuit and integrating circuit. The pulse width modulation circuit can be realized by a simpler circuit arrangement than an A/D converter, and the integrating circuit can also be realized by a simple circuit configuration. Consequently, the invention can provide an inexpensive heater temperature control circuit. Furthermore, the duty of the output signal delivered from the pulse width modulation circuit and accordingly, the reference voltage can minutely be changed. Consequently, a complicated temperature control can be realized by minutely adjusting the reference voltage according to the external instruction signal. The external instruction may be supplied from a microcomputer, for example. In this case, the heater temperature can be controlled minutely and suitably for various conditions by means of software on the basis of programs incorporated in the microcomputer.

In the above-described heater temperature control circuit, the pulse width modulation circuit preferably comprises a duty setting circuit forming a set duty value based on an instruction signal corresponding to an external digital signal, thereby delivering the set duty value as a set duty value signal, and a pulse forming circuit forming, on the basis of the set duty value signal delivered from the duty setting circuit, a pulse signal having a duty according to the set duty value, thereby delivering the pulse signal to the integrating circuit. This circuit arrangement can readily be realized by simple ICs.

The pulse width modulation circuit preferably switches a duty of the output signal thereof according to the control signal delivered from the heater control circuit to thereby give a hysteresis function to heater control. This arrangement can realize the hysteresis function without an external circuit (resistance).

The above-mentioned duty setting circuit preferably comprises a storage circuit for storing a set value and an offset value based on the instruction signal corresponding to the external digital signal, and a set duty value forming circuit for forming any one of a plurality of set duty values obtainable on the basis of the set value and offset value stored in the storage circuit, thereby delivering the formed set duty value serving as the set duty value signal. In the above-described arrangement, the hysteresis function can be provided by addition and/or subtraction of the offset value or the like.

The heater control circuit preferably comprises a comparator comparing the output voltage from the voltage divider circuit with the reference voltage, thereby delivering either a heater energization signal or a heater deenergization signal each serving as the control signal based on results of comparison. Thus, the heater control circuit can readily be realized by a simple circuit configuration. Furthermore, the resistance having the predetermined resistance value in the voltage divider circuit is preferably selected from a plurality of resistances having different resistance values according to the amount of heat generated by the heater, which amount of heat being externally instructed or required. In this arrangement, the output voltage of the voltage divider circuit can be changed as well as the reference voltage. Consequently, for example, a large-scale change in a measured temperature range can be realized by the switching of the resistance of the voltage divider circuit.

BRIEF DESCRIPTION OF THE DRAWINGS

Other objects, features and advantages of the present invention will become clear upon reviewing the following description of preferred embodiments thereof, made with reference to the accompanying drawings, in which.

DETAILED DESCRIPTION OF THE PREFERRED EMBODIMENT

Figure 1:
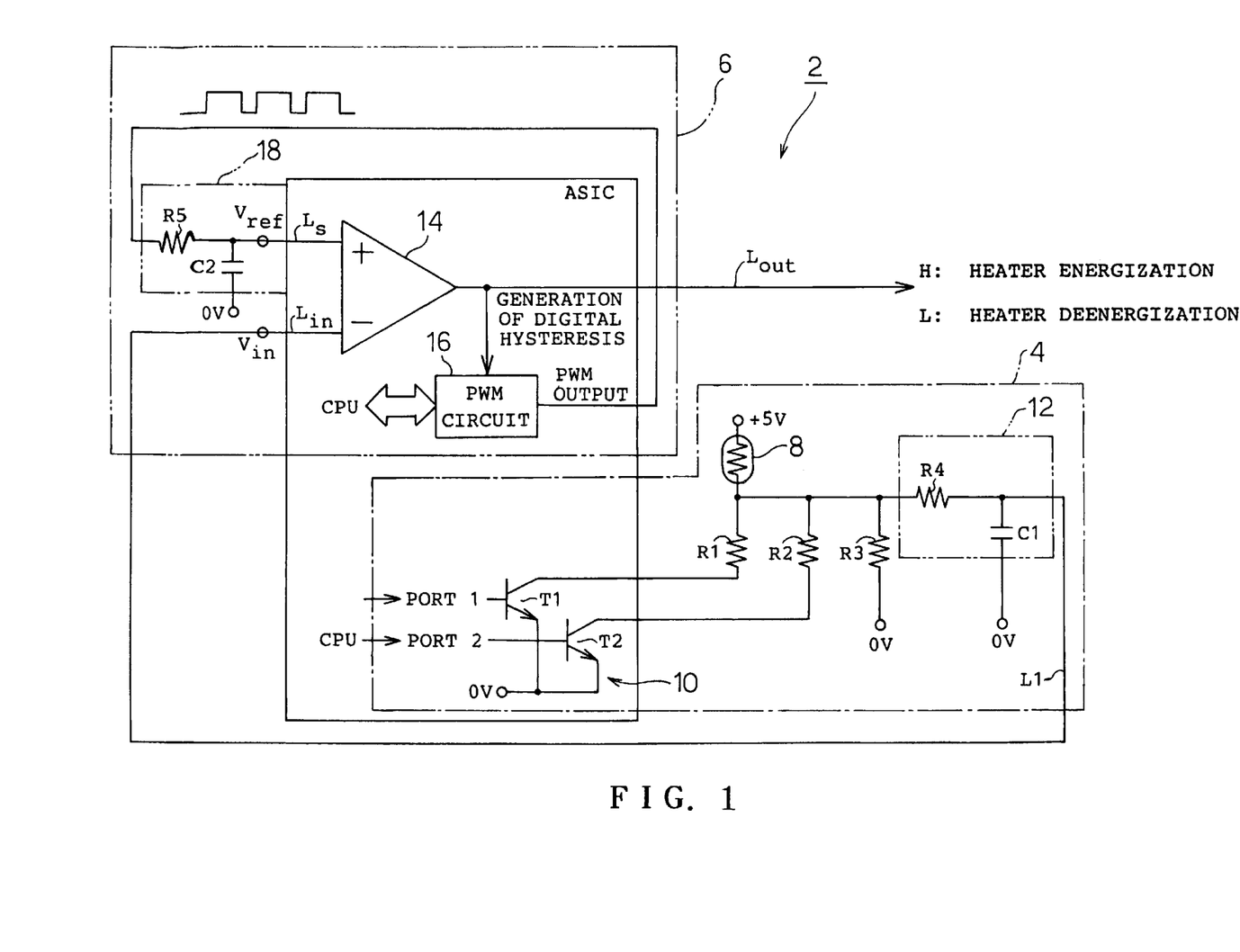
FIG. 1 is an electric circuit diagram of a heater temperature control circuit of one embodiment in accordance with the present invention.

One embodiment of the present invention will be described with reference to FIGS. 1 to 4. In the embodiment, the heater temperature control circuit of the invention is applied to a laser printer. Referring to FIG. 1, an electrical arrangement of the heater temperature control circuit 2 of the embodiment is shown. The heater temperature control circuit 2 is provided for controlling a temperature of a heater for fixing a toner image on a recording material such as a paper sheet in the laser printer. The heater temperature control circuit 2 comprises a voltage divider circuit 4 and a heater control circuit 6. The voltage divider circuit 4 comprises a thermistor 8, a plurality of resistances R1, R2 and R3 provided at the low potential side of the thermistor 8, a switching circuit 10 provided at the low potential side of the two resistances R1 and R2, and a noise eliminator circuit 12 provided on a line L1 for detecting a voltage divided by the thermistor 8 and one of the resistances R1 to R3. The plurality of resistances R1 to R3 are disposed in parallel with one another and have different resistances. The switching circuit 10 comprises two transistors T1 and T2 provided at the low potential sides of the two resistances R1 and R2 respectively. The noise eliminator circuit 12 comprises a resistance R4 provided on the line L1 and a capacitor C1.

Figure 2:
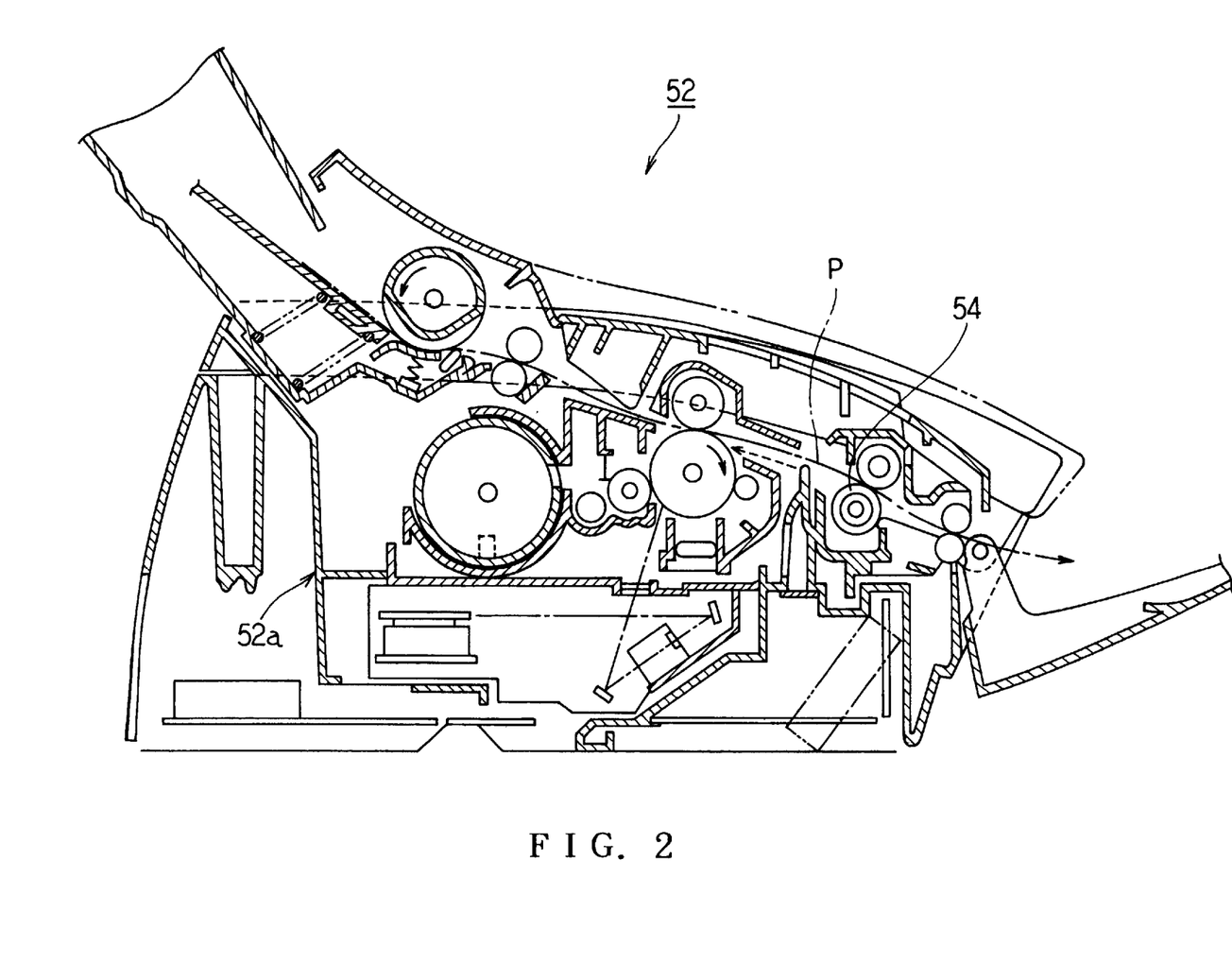
FIG. 2 is a schematic sectional side view of a laser printer in which the heater temperature control circuit of the embodiment is incorporated.

The heater temperature control circuit 2 configured as described above is disposed in a main frame 52a of the laser printer 52 as shown in FIG. 2 except for the thermistor 8 which is disposed in a heating roller 54 for fixing a toner image on a recording paper sheet P. A toner image fixing heater is also provided in the heating roller 54. A resistance value of the thermistor 8 is varied with temperature changes due to heat generation from the heater, namely, temperature changes of the heating roller 54. The variations in the resistance value of the thermistor 8 appear as voltage changes on the line L1. A detailed construction of the laser printer shown in FIG. 2 is substantially the same as that of a laser printer described in U.S. Pat. No. 5,630,198 assigned to the same assignee as of the present application. Therefore, U.S. Pat. No. 5,630,198 is incorporated herein by reference.

The voltage on the line L1 is determined by a ratio of resistance values of the thermistor 8 and the resistance R3 (180 KΩ, for example) when the switching circuit 10 in FIG. 1 is in a nonoperative state, namely, when the transistors T1 and T2 are turned off. On the other hand, the voltage on the line L1 is determined by the thermistor 8, the resistance R3, and the resistance R1 (8.2 KΩ, for example) or the resistance R2 (18 KΩ, for example) when the switching circuit 10 is in an operative state, namely, when a control signal (high level signal) from a CPU controlling an entire operation of the laser printer 52 is delivered to either a port 1 or a port 2 so that either transistor T1 or T2 is turned on. In this arrangement, a range of temperature measured by the thermistor 8 can be changed in a large scale by the switching circuit 10.

The heater control circuit 6 comprises a comparator 14, a pulse width modulation circuit (hereinafter, "PWM circuit") 16, and an integrating circuit 18. The comparator 14 compares the voltage $V_{in}$ on a comparison line $L_{in}$ with a reference voltage $V_{ref}$ on a reference line $L_s$. The comparator 14 delivers a high level output signal to an output line $L_{out}$ when the reference voltage $V_{ref}$ is higher than the voltage $V_{in}$, namely, when the temperature of the heater is lower than a set temperature. On the other hand, the comparator 14 delivers a low level output signal to the output line $L_{out}$ when the reference voltage $V_{ref}$ is lower than the voltage $V_{in}$, namely, when the heater temperature is higher than the set temperature. Based on instructions from the CPU, the PWM circuit 16 supplies, to the integrating circuit comprising a resistance R5 and a capacitor C2, a pulse signal having a duty the CPU requires. The integrating circuit 18 delivers, to the reference line $L_s$ of the comparator 14, the voltage signal $V_{ref}$ having a voltage level according to the duty of the pulse signal. The PWM circuit 16 determines whether an offset value is added to the output to the reference line $L_s$, depending upon whether the output of the comparator 14 is at the high level or the low level, thereby giving a hysteresis function to the control for the heater.

Figure 3:
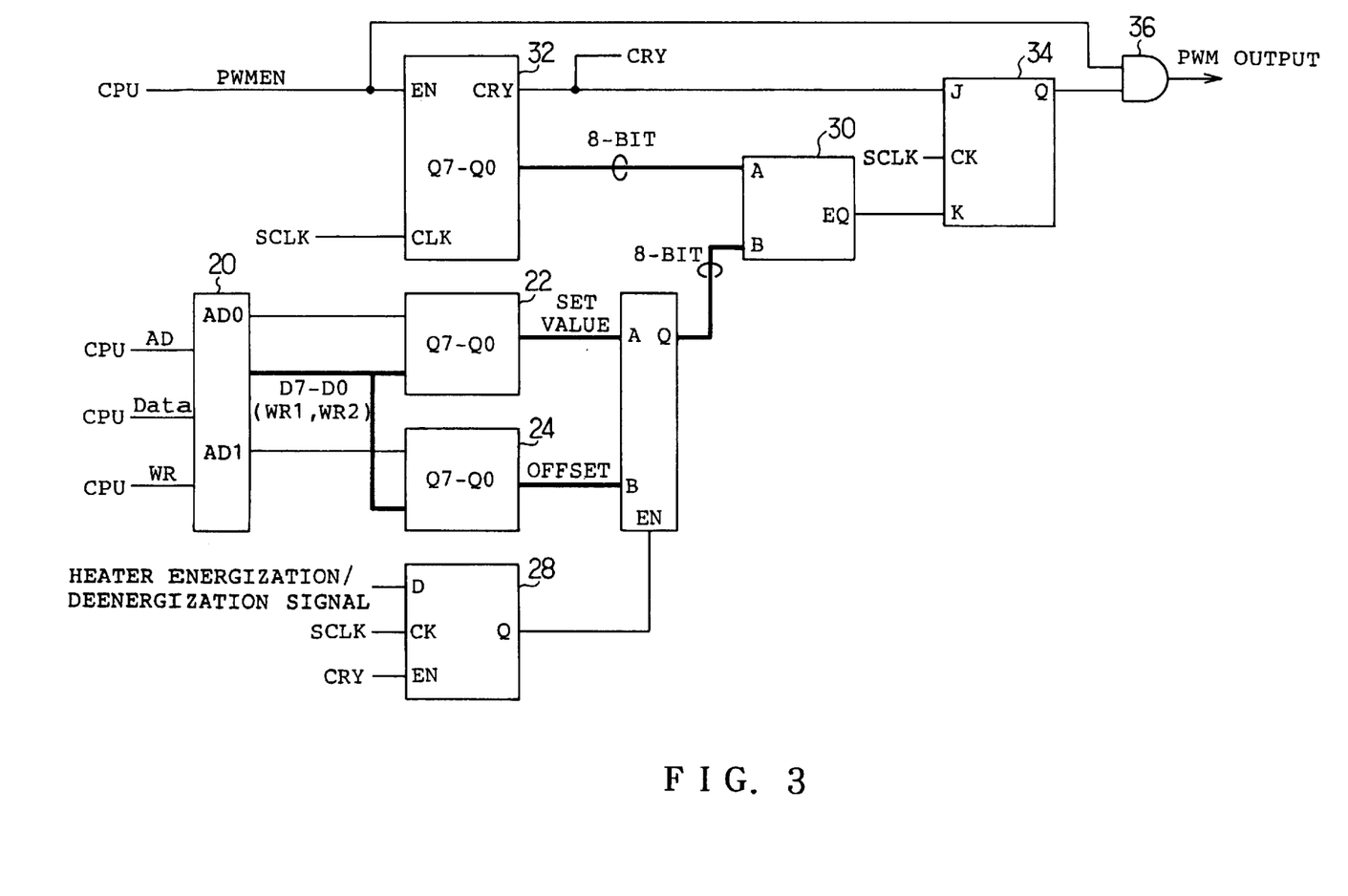
FIG. 3 is a schematic block diagram showing the arrangement of a pulse width modulation circuit.

Referring now to FIG. 3, an arrangement of the PWM circuit 16 is schematically shown. The CPU delivers an address signal AD, a data signal Data, and a write signal WR to a decoder 20 of the PWM circuit 16 for the purpose of realization of a set temperature required according to the conditions of the laser printer 52. The address signal AD is decoded by the decoder 20. When the decoded address signal AD indicates an address AD0 of an 8-bit latch circuit provided for storing a set value, the data signal Data or more specifically, an 8-bit set value WR1 (D7 to D0) is stored in the latch circuit 22. On the other hand, when the address signal AD indicates an address AD1 of an 8-bit latch circuit 24 provided for storing an offset value, the data signal Data or more specifically, an 8-bit offset value WR2 (D7 to D0) is stored in the latch circuit 24.

Referring further to FIG. 3, an 8-bit adder 26 adds the offset value WR2 delivered from the latch circuit 24 to the set value WR1 delivered from the latch circuit 22 when an enabling signal is delivered from a D flip-flop 28 to the adder 26. The adder 26 delivers a new set value obtained by the addition to an 8-bit comparator 30. On the other hand, the adder 26 delivers the set value WR1 supplied from the latch circuit 22 to the comparator 30 without addition when a disenabling signal is delivered from the D flip-flop 28 to the adder 26.

The 8-bit comparator 30 compares an 8-bit count delivered from an 8-bit counter 32 with the 8-bit set value from the adder 26. The comparator 30 turns its output EQ to a high level when the count is equal to the set value. That is, the comparator 30 delivers a high level pulse signal in a period in which the count is equal to the set value. The 8-bit counter 32 counts a system clock SCLK or more specifically, periodically delivers the values of 0 to 255 to the 8-bit comparator 30. Furthermore, the counter 32 delivers a carry CRY to both a J-K flip-flop 34 and the D flip-flop 28 when the count is returned from 255 to 0.

Figure 4:
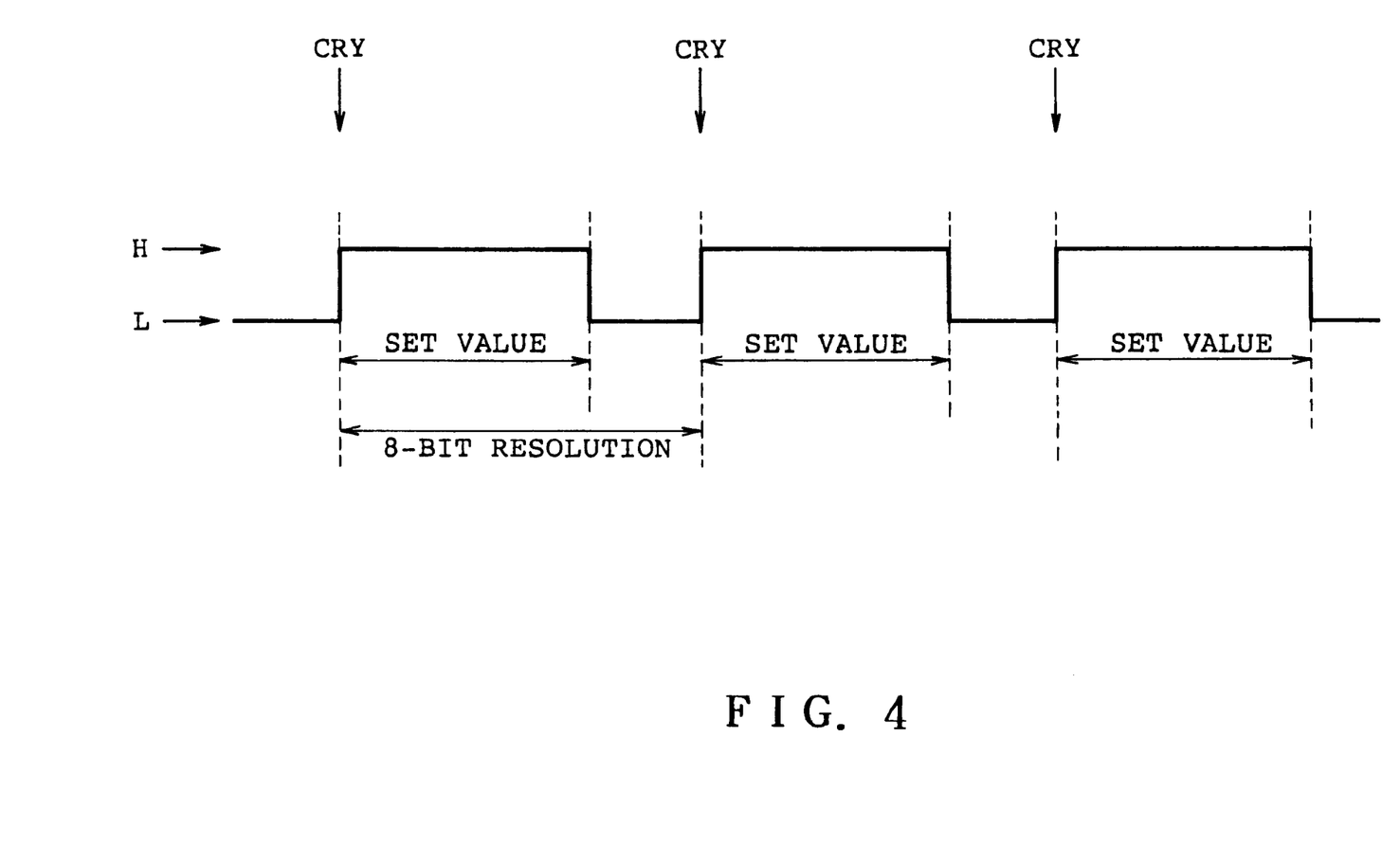
FIG. 4 shows the duty of a pulse delivered from the pulse width modulation circuit.

The J-K flip-flop 34 turns an output Q to the high level when a pulse signal of the carry CRY is supplied to a terminal J thereof. The J-K flip-flop 34 is reset to thereby turn the output Q to the low level when an output EQ of the comparator 30 is periodically supplied to a terminal K thereof. That is, as shown in FIG. 4, the output Q of the J-K flip-flop 34 rises to the high level every time the carry CRY is generated in the 8-bit counter 32, whereas the J-K flip-flop 34 is reset to drop the output Q to the low level every time the count of the counter 32 becomes equal to the set value. Consequently, the duty of the output Q is set for (the set value/256). Accordingly, the CPU can minutely adjust the duty of the output Q at the resolution of 8-bit by changing the set value WR1. Since the duty is converted to the reference voltage $V_{ref}$ by the integrating circuit 18, the CPU can minutely control the reference voltage $V_{ref}$ for the comparator 14. In this case, the output Q of the J-K flip-flop 34 is 5 V at the high level and 0 V at the low level. Accordingly, the CPU can control the reference voltage $V_{ref}$ at the resolution of 5/256 V.

The 8-bit counter 32 is designed to execute the counting operation when an enabling signal PWMEN delivered from the CPU is at the high level. Furthermore, since the pulse signal is delivered from the J-K flip-flop 34 via an AND gate circuit 36 to the comparator 14 side, the pulse signal from the J-K flip-flop is allowed to be delivered to the comparator 14 side when the enabling signal from the CPU is at the high level.

When the heater in the heating roller 54 is controlled to be in the ON state (H) at first, the signal EN the 8-bit adder 26 receives from the D flip-flop 28 is in the enable state (high level). Accordingly, a hysteresis error (offset value) B is added to the set duty value A so that a new set duty value is set. The new set duty value is compared with the output of the counter 32. The J-K flip-flop 34 is reset when the set duty value becomes equal to the output of the counter 32. Since a period of high level output in one cycle is rendered longer by the hysteresis error B, the reference voltage obtained by integration is higher by the hysteresis error B. The voltage $V_{in}$ is raised when the heater is kept in the ON state. The heater is turned off (L) when $V_{in} > V_{ref}$.

The signal EN delivered from the D flip-flop 28 to the 8-bit adder 26 is turned to the disenabling state (low level) when the heater is turned off. As a result, the hysteresis error B is not added to the set duty value A. Accordingly, the 8-bit comparator 30 compares the output of the 8-bit counter 32 with the set duty value A which is lower by the offset value than the last set duty value. The J-K flip-flop 34 is reset when they agree with each other. More specifically, since a high level period in one cycle is equal to the set duty value A itself in this case, the delivered voltage $V_{ref}$ integrated is lower by the hysteresis error B than the previous reference voltage. Accordingly, the heater is subsequently turned on when the temperature detected by the thermistor 8 or the temperature of the heating roller 54 drops to a value smaller by the hysteresis error B than the temperature at which the heater was turned off.

The output of the PWM circuit 16 is integrated by the integrating circuit 18 to be generated into the reference voltage $V_{ref}$ as described above. Consequently, the reference voltage $V_{ref}$ can minutely be changed on the basis of the program by the CPU. This allows free minute changes of the controlled temperature of the heater without replacement of resistances of the voltage divider circuit 4 or without changes in the resistance values. As a result, a minute temperature control in a wider range of application can be accomplished.

A more concrete example of the heater temperature control by the CPU will now be described. The CPU is adapted to determine the set temperature of the heater so that it becomes a most suitable temperature according to a thickness, quality, etc. of paper sheet set on a printer driver installed in a personal computer (not shown) or the like by the user or set via an operation panel (not shown) of the laser printer by the user. More specifically, the CPU is capable of setting, as the heater set temperature, three temperature values, for example, 160° C., 170° C. and 180° C. A most suitable temperature is selected from the three values according to the set paper thickness, quality, etc. When the temperature of the heater is set for 160° C., the CPU stores, in a set value storing 8-bit latch circuit 22, a 160° C. set value WR1-160 at which a duty corresponding to a 160° C. setting reference voltage $V_{ref}$ is established. In the same manner, the CPU stores, in the latch circuit 22, a 170° C. set value WR1-170 or a 180° C. set value WR1-180 when the temperature of the heater is set for 170° C. or 180° C. Although the three temperatures are provided at intervals of 10° C. as the heater set temperatures in the embodiment, four or more temperatures may be provided at closer intervals, for example, 5° C., 3° C. or 2° C. Furthermore, the CPU can change an offset value WR2 to be stored in an offset value storing 8-bit latch circuit 24 to freely set the hysteresis error B for the heater temperature control. For example, when the type of the heater built into the heating roller 54 is changed or when the heating system is re-designed, the offset value WR2 may be changed so as to cope with these changes.

In the above-described arrangement, the decoder 20, the set value storing 8-bit latch circuit 22, the offset value storing 8-bit latch circuit 24, the 8-bit adder 26, and the D flip-flop 28 constitute a duty setting circuit in the invention. The 8-bit comparator 30, the 8-bit counter 32, and the J-K flip-flop 34 constitute a pulse forming circuit in the invention. The 8-bit latch circuits 22 and 24 constitute storage circuits for storing the set value and the offset value respectively. The 8-bit adder 26 and the D flip-flop 28 constitute a set duty value forming circuit. The CPU and the operating programs therefor constitute a setting circuit.

The comparator 14, the PWM circuit 16, and the switching circuit 10 are composed into an application specific IC (ASIC) in the above-described embodiment. Thus, since the three circuits are composed into a single IC, the electrical arrangement of the heater temperature control circuit can be compacted and accordingly, the laser printer 52 can be rendered smaller in size.

In the foregoing embodiment, the heater is turned on when the output signal or control signal delivered from the comparator 14 of the heater control circuit 6 is at the high level, whereas the heater is turned off when the output signal is at the low level. More specifically, the output signal delivered from the comparator 14 is amplified by an amplifier circuit (driver), and subsequently, the amplified signal is supplied to drive the switching element, such as a triac, for turning the heater on and off. Alternatively, the CPU may input the output signal delivered from the comparator 14 to judge at which the output signal is, the high level or the low level. Based on the results of judgment, the CPU may on/off-control, via a driver, the switching element, such as the triac, turning the heater on and off. In this case, the CPU processes the output signal from the comparator 14 by means of software to thereby turn the heater on and off. When a sampling period for which the CPU inputs the output signal from the comparator 14 is set for about 0.1 seconds, for example, the sampling period can accomplish the same function as the above-described hysteresis function. Consequently, an electric circuit arrangement for providing the hysteresis function can be eliminated.

In the foregoing embodiment, furthermore, the reference voltage $V_{ref}$ is minutely changed so that the controlled temperature for the heater or the target temperature is minutely changed. However, the CPU may input the output signal from the comparator 14, changing the reference voltage $V_{ref}$ minutely or, for example, by a minimum resolution of the duty, thereby minutely detecting the temperature changes in the heater or the heating roller 54.

Furthermore, the voltage dividing resistances R1, R2 and R3 are selectively switched by the switching circuit 10 in the foregoing embodiment. However, the switching circuit 10 and the resistances R1 and R2 may not be provided when the reference voltage $V_{ref}$ is minutely changed by the CPU. Furthermore, the resolution for the control of the reference voltage $V_{ref}$ is set for 8 bit in the foregoing embodiment. However, the resolution may exceed 8 bit. For example, when 10-bit counters and comparator are employed, the resolution can be increased and accordingly, a minuter temperature control can be achieved.

The foregoing description and drawings are merely illustrative of the principles of the present invention and are not to be construed in a limiting sense. Various changes and modifications will become apparent to those of ordinary skill in the art. All such changes and modifications are seen to fall within the true spirit and scope of the invention as defined by the appended claims.

I claim:

1. A heater temperature control circuit comprising:
   a voltage divider circuit delivering an output voltage divided by a thermistor having a resistance value changing with temperature changes due to generation of heat by a heater and a resistance having a predetermined resistance value;
   a heater control circuit comparing the output voltage of the voltage divider circuit with a reference voltage, thereby delivering a control signal for controlling an amount of heat generated by the heater on the basis of results of comparison;
   a pulse width modulation circuit changing a duty of an output signal thereof in response to an external instruction signal; and
   an integrating circuit integrating the output signal delivered from the pulse width modulation circuit, thereby delivering an integrated signal serving as the reference voltage.

2. A heater temperature control circuit according to claim 1, wherein the pulse width modulation circuit comprises:
   a duty setting circuit forming a set duty value based on an instruction signal corresponding to an external digital signal, thereby delivering the set duty value serving as a set duty value signal; and
   a pulse forming circuit forming, on the basis of the set duty value signal delivered from the duty setting circuit, a pulse signal having a duty according to the set duty value, thereby delivering the pulse signal to the integrating circuit.

3. A heater temperature control circuit according to claim 1, wherein the pulse width modulation circuit switches a duty of the output signal thereof according to the control signal delivered from the heater control circuit to thereby give a hysteresis function to heater control.

4. A heater temperature control circuit according to claim 2, wherein the pulse width modulation circuit switches a duty of the output signal thereof according to the control signal delivered from the heater control circuit to thereby give a hysteresis function to heater control.

5. A heater temperature control circuit according to claim 2, wherein the duty setting circuit comprises:
   a storage circuit for storing a set value and an offset value based on the instruction signal corresponding to the external digital signal; and
   a set duty value forming circuit for forming any one of a plurality of set duty values obtainable on the basis of the set value and offset value stored in the storage circuit, thereby delivering the formed set duty value serving as the set duty value signal.

6. A heater temperature control circuit according to claim 4, wherein the duty setting circuit comprises:
   a storage circuit for storing a set value and an offset value based on the instruction signal corresponding to the external digital signal; and
   a set duty value forming circuit for forming any one of a plurality of set duty values obtainable on the basis of the set value and offset value stored in the storage circuit, thereby delivering the formed set duty value serving as the set duty value signal.

7. A heater temperature control circuit according to claim 1, wherein the heater control circuit comprises a comparator comparing the output voltage from the voltage divider circuit with the reference voltage, thereby delivering either a heater energization signal or a heater deenergization signal each serving as the control signal based on results of comparison.

8. A heater temperature control circuit according to claim 2, wherein the heater control circuit comprises a comparator comparing the output voltage from the voltage divider circuit with the reference voltage, thereby delivering either a heater energization signal or a heater deenergization signal each serving as the control signal based on results of comparison.

9. A heater temperature control circuit according to claim 3, wherein the heater control circuit comprises a comparator comparing the output voltage from the voltage divider circuit with the reference voltage, thereby delivering either a heater energization signal or a heater deenergization signal each serving as the control signal based on results of comparison.

10. A heater temperature control circuit according to claim 5, wherein the heater control circuit comprises a comparator comparing the output voltage from the voltage divider circuit with the reference voltage, thereby delivering either a heater energization signal or a heater deenergization signal each serving as the control signal based on results of comparison.

11. A heater temperature control circuit according to claim 7, further comprising a switching element for turning the heater on and off, the switching element being driven to be turned on and off by the control signal delivered from the comparator.

12. A heater temperature control circuit according to claim 7, further comprising a switching element for turning the heater on and off, and a control circuit supplied with the control signal from the comparator to on/off-control the switching element based on the supplied control signal.

13. A heater temperature control circuit according to claim 1, wherein the resistance having the predetermined resistance value in the voltage divider circuit is selected from a plurality of resistances having different resistance values according to the amount of heat generated by the heater, which amount of heat being externally instructed or required.

14. A heater temperature control circuit according to claim 2, wherein the resistance having the predetermined resistance value in the voltage divider circuit is selected from a plurality of resistances having different resistance values according to the amount of heat generated by the heater, which amount of heat being externally instructed or required.

15. A heater temperature control circuit according to claim 3, wherein the resistance having the predetermined resistance value in the voltage divider circuit is selected from a plurality of resistances having different resistance values according to the amount of heat generated by the heater, which amount of heat being externally instructed or required.

16. A heater temperature control circuit for controlling a temperature of a heater for fixing a toner image in a laser printer, the circuit comprising:

a voltage divider circuit delivering an output voltage divided by a thermistor having a resistance value changing with temperature changes due to generation of heat by a heater and a resistance having a predetermined resistance value;

a heater control circuit comparing the output voltage of the voltage divider circuit with a reference voltage, thereby delivering a control signal for controlling an amount of heat generated by the heater on the basis of results of comparison;

a pulse width modulation circuit changing a duty of an output signal thereof in response to an external instruction signal;

an integrating circuit integrating the output signal delivered from the pulse width modulation circuit, thereby delivering an integrated signal serving as the reference voltage;

wherein the pulse width modulation circuit comprises:
a duty setting circuit forming a set duty value based on an instruction signal corresponding to an external digital signal, thereby delivering the set duty value serving as a set duty value signal; and
a pulse forming circuit forming, on the basis of the set duty value signal delivered from the duty setting circuit, a pulse signal having a duty according to the set duty value, thereby delivering the pulse signal to the integrating circuit; and wherein the duty setting circuit comprises:
a storage circuit for storing a set value and an offset value based on the instruction signal corresponding to the external digital signal; and
a set duty value forming circuit for forming any one of a plurality of set duty values obtainable on the basis of the set value and offset value stored in the storage circuit, thereby delivering the formed set duty value serving as the set duty value signal; and a setting circuit setting the set value and the offset value to be stored in the storage circuit, based on information including a type of recording material set by a user.

* * * * *